United States Patent
Pandian

(10) Patent No.: US 7,005,757 B2
(45) Date of Patent: Feb. 28, 2006

(54) PNEUMATIC HUMAN POWER CONVERSION SYSTEM BASED ON CHILDREN'S PLAY

(76) Inventor: Shunmugham Rajasekara Pandian, 1069 Barton Dr., Apt. 109, Ann Arbor, MI (US) 48105

( * ) Notice: Subject to any disclaimer, the term of this patent is extended or adjusted under 35 U.S.C. 154(b) by 275 days.

(21) Appl. No.: 10/369,081

(22) Filed: Feb. 18, 2003

(65) Prior Publication Data

US 2004/0160059 A1 Aug. 19, 2004

(51) Int. Cl.
A63B 71/00 (2006.01)

(52) U.S. Cl. .............................. 290/1 R; 472/134; 482/2
(58) Field of Classification Search ................ 290/1 R; 60/325; 184/55.2; 472/134, 32; 482/2
See application file for complete search history.

(56) References Cited

U.S. PATENT DOCUMENTS

| | | | | |
|---|---|---|---|---|
| 2,646,281 A | * | 7/1953 | Hurst | 472/14 |
| 3,578,318 A | * | 5/1971 | Young | 472/134 |
| 3,653,465 A | * | 4/1972 | Wheeler, Jr. | 184/55.2 |
| 3,698,710 A | * | 10/1972 | Schwarzkopf | 472/32 |
| 4,052,849 A | * | 10/1977 | Dumbaugh | 60/325 |
| 4,234,014 A | * | 11/1980 | Knight | 137/557 |
| 4,288,071 A | * | 9/1981 | Glickson | 472/134 |
| 4,389,047 A | * | 6/1983 | Hall | 482/2 |

(Continued)

FOREIGN PATENT DOCUMENTS

| | | | |
|---|---|---|---|
| FR | 2507838 A1 | * | 12/1982 |
| FR | 2585961 A1 | * | 2/1987 |
| JP | 62237083 A | * | 10/1987 |
| JP | 08226377 A | * | 9/1996 |
| JP | 08317578 A | * | 11/1996 |

OTHER PUBLICATIONS

Bimba Air–to–Air Booster Cylinder, Bimba Manufacturing Company Catalog, Apr. 19, 2002.*
Martyn B. Cowley, W. Ray Morgan, P. Maccready, Summary of conference proceedings entitled "Bionic Bat: Stored Energy Human Power Aircraft", AeroVironment, Inc. California.
Hideyuki Tsukagoshi, Atsushi Miyashita, Ato Kitagawa, Summary of conference proceedings entitled "A Fundamental Consideration of a Human Power Pedal Air Pump for Disaster", Jul. 28–30, 1999, pp. 541–542, SICE in MOrioka, Japan.

Primary Examiner—Joseph Waks
(74) Attorney, Agent, or Firm—Butzel Long

(57) ABSTRACT

When large numbers of children play in a playground, part of the power of their play could be usefully harnessed resulting in large energy storage. This stored energy can then be converted for basic, low-power, applications in the school such as lighting, communication, or operating fans. Energy can be produced through the use of pneumatic (i.e., compressed air) systems such as cylinders, motors, valves, and regulators for the conversion of human power of children's play in school playgrounds and other public places. The energy of the compressed air can then be converted to electricity for purposes such as lighting and communication. This provides a low-cost, low-resource means of generation of electricity, especially for use in developing countries.

16 Claims, 10 Drawing Sheets

U.S. PATENT DOCUMENTS

| | | | |
|---|---|---|---|
| 4,456,277 A | | 6/1984 | Carpenter |
| 4,719,158 A | * | 1/1988 | Salomon ..................... 429/50 |
| 4,936,569 A | * | 6/1990 | West ........................... 472/14 |
| 5,087,037 A | * | 2/1992 | Morrow ....................... 482/33 |
| 5,243,224 A | * | 9/1993 | Tagney, Jr. .................. 290/1 R |
| 5,252,859 A | * | 10/1993 | Tagney, Jr. .................. 290/1 R |
| 5,355,674 A | * | 10/1994 | Rosenberg ................... 60/325 |
| 5,448,889 A | | 9/1995 | Bronicki |
| 5,917,310 A | | 6/1999 | Baylis |
| 5,951,406 A | * | 9/1999 | Steane ........................ 472/111 |
| 5,983,845 A | * | 11/1999 | Yanagisawa ................ 123/53.1 |
| 5,997,500 A | * | 12/1999 | Cook et al. .................... 604/60 |
| 6,036,282 A | * | 3/2000 | Clarke et al. .................. 303/7 |
| 6,236,185 B1 | * | 5/2001 | Hines et al. ................. 320/101 |
| 6,281,594 B1 | * | 8/2001 | Sarich ........................ 290/1 R |
| 6,305,171 B1 | | 10/2001 | Negre et al. |
| 6,327,994 B1 | * | 12/2001 | Labrador ..................... 114/382 |
| 6,662,704 B1 | * | 12/2003 | Nelson ......................... 91/314 |
| 2002/0020401 A1 | | 2/2002 | Grichen |

* cited by examiner

PNEUMATIC HUMAN POWER CONVERSION SYSTEM BASED ON CHILDREN'S PLAY

TECHNICAL FIELD

The present invention is based on the use of pneumatic (i.e., compressed air) systems such as cylinders, motors, valves, and regulators for the conversion of human power of children's play in school playgrounds and other public places. The energy of the compressed air can then be converted to electricity for purposes such as lighting and communication. This provides a low-cost, low-resource means of generation of electricity, especially for use in developing countries.

BACKGROUND OF THE INVENTION

The current state-of-art inventions using human power are mainly based on harnessing human power at the individual level. Therefore, they are limited to producing low power output and are discontinuous. For example, rotating the crank of a clockwork radio for a few minutes produces enough power for the radio for about half hour or for several seconds of lighting.

By contrast, the present invention is based on harnessing the collective energy of a number of children, so the power output is large and sufficient for continuous operation of several lights, fans, and communication equipment for a long time.

Secondly, the power is produced as part of play and therefore separate, deliberate effort is not required to produce power.

Thirdly, the proposed approach involves low cost: a clockwork radio producing a few watts of power generally costs $50 or more. For the cost of a few hundred dollars, the hardware for the play-based power harvesting system could produce several hundreds of watts of electricity.

Finally, the new invention is eminently suited to developing countries where the main constraints are cost, ruggedness, and low-resource and skill requirements (cf. piezoelectric or storage capacitors). The pneumatic technology involved is fairly simple, well known, and requires little or easy maintenance.

SUMMARY OF THE INVENTION

The present invention is based on the harnessing of human power during children's play in playgrounds and public places, on devices such as the seesaw, merry-go-round and swings. While individual human calorific consumption of 2500 kilocalories per day is equivalent to the energy stored in about 1050 AA batteries, harnessing this power individually results in expensive, mainly electrical, systems with low-power outputs, e.g., clockwork radio, hand-cranked lantern, etc.

Human power was one of the earliest sources of energy known to mankind, and was widely used in the $19^{th}$ and early $20^{th}$ centuries for purposes such as irrigation, operating machinery, and as source of electricity for watching/listening to radio and television. Availability of low-cost energy made it superfluous, but in recent years human power conversion is making a comeback due to economic, environmental, and technological factors.

Trevor Baylis's (re)invention of the clock work radio contributed immensely to this trend. Various new inventions are based on the use of human power conversion for flash lights, cell phone battery charges, wrist watches, power-harvesting shoes for soldiers, laptop and wearable computers, children's toys, and so on.

Compressed air energy storage and actuation have advantages of environment-friendliness and low-cost, and are being employed widely in applications ranging from children's toys to underground energy storage for peak-power demand. While compressed air systems have low energy efficiency, high-efficiency compressor systems have been developed for gasoline-pneumatic hybrid cars.

There are several approaches to harnessing human power: electric, pneumatic, hydraulic, flywheel, piezoelectric, etc. One of the most challenging technologies using human power is the human powered aircraft Bionic Bat developed by Paul MacCready and others.

Several commercial products based on the human power conversion exist. Human power conversion has been used in pneumatic orthosis systems to reduce the need for large air reservoirs. It has also been proposed as a power source for emergency rescue situations such as earthquakes.

The closest technology to the present invention is a play pump developed by a British group in South Africa, and presented on BBC World TV program "Earth Matters" in 1999. In this system, a reciprocating hydraulic cylinder is used to harness the power of a children's merry-go-around to activate a hydraulic pump for irrigation purposes in a nearby field. The cost of the system was about £5000. The system can be considered a multi-person version of the conventional manual pump for pumping water.

A "Last Page: Think It's New? Think Again" article in the September 1998 issue of Popular Mechanics refers to how exercise bikes producing electricity have made a comeback after almost 100 years. It mentions that "For instance, a participant at a recent conference on education in developing nations suggested using stationary bicycles to power classroom PCs. It's not so farfetched—fast pedaling can generate about 100 watts, and teachers worldwide have long sought to harness the vast, untapped power of a room full of 10-year olds"!

Using exercise bikes may be considered monotonous by children, compared to playing outdoors in the playground. Therefore, the invention outlined here is a more natural and child-friendly way of producing power for basic needs.

When large numbers of children play in a playground, part of the power of their play could be usefully harnessed resulting in large energy storage. This stored energy can then be converted for basic, low-power, applications in the school such as lighting, communication, operating fans, and so on.

Compressed air devices are used for the conversion and storage of human power in the present invention, though electric generators can also be used for this purpose. The main reason for this is the hazards of electric shock and fire in the case of malfunction or accidents leaving open wires. Use of compressed air is explosion- and fire-proof and open tubing results simply in air leakage. The lower efficiency of the resulting system (due to pressure drop in pipelines and heat in pressurizing) is compensated by the simplicity, safety, and low-cost of operation of the pneumatic system.

The compressed air will be stored in storage tank(s) close to the point of use, and will be used to power a pneumatic actuator such as cylinder or air motor, which will in turn move an electric generator to produce electricity. The electricity will be stored in batteries, and used to power dc-operated lights and appliances or to power ac-operated appliances through the use of inverters and power control circuitry.

The energy storage capacity of compressed air is limited compared to alternatives such as batteries. Therefore, low-cost microcontroller-based systems can be used to control and convert the compressed air stored in a limited volume. In many cases, though, storage space is not a constraint around playgrounds or schools, so simpler solutions using mechanical devices such as pressure regulators can be used.

These and other objects of the present invention will become apparent upon reading the following detailed description in combination with the accompanying drawings, which depict systems and components that can be used alone or in combination with each other in accordance with the present invention.

DESCRIPTION OF THE PREFERRED EMBODIMENT

Figure 1:
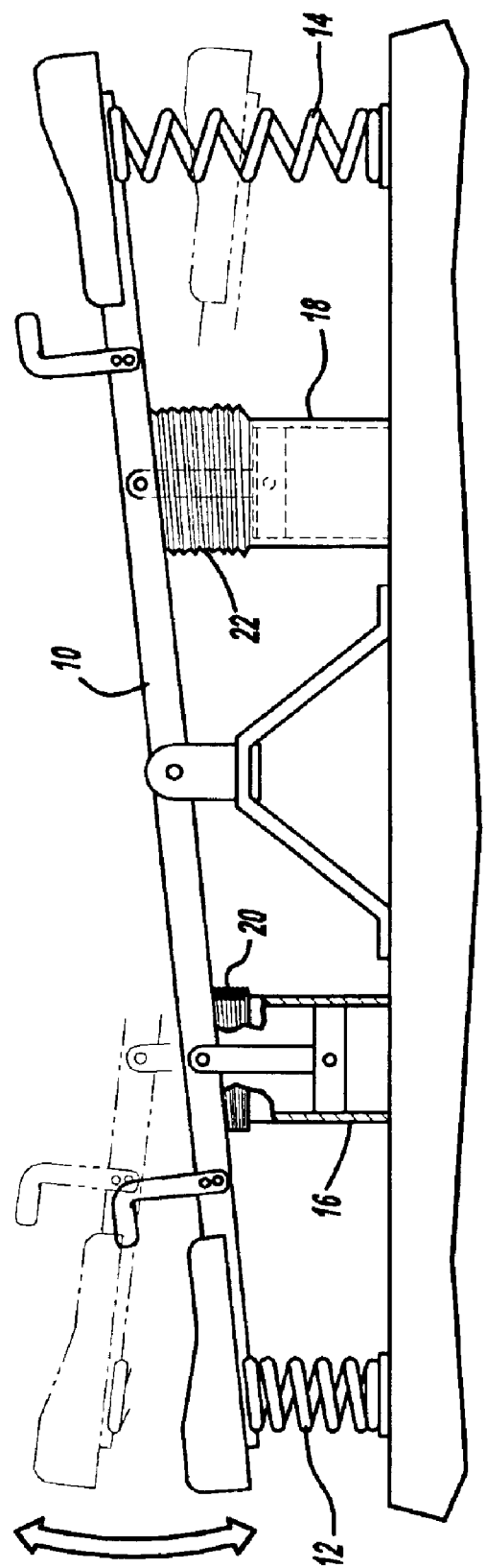
FIG. 1 illustrates a preferred embodiment of the present invention wherein the energy conversion is compressed air energy storage based on a seesaw.
Figure 2:
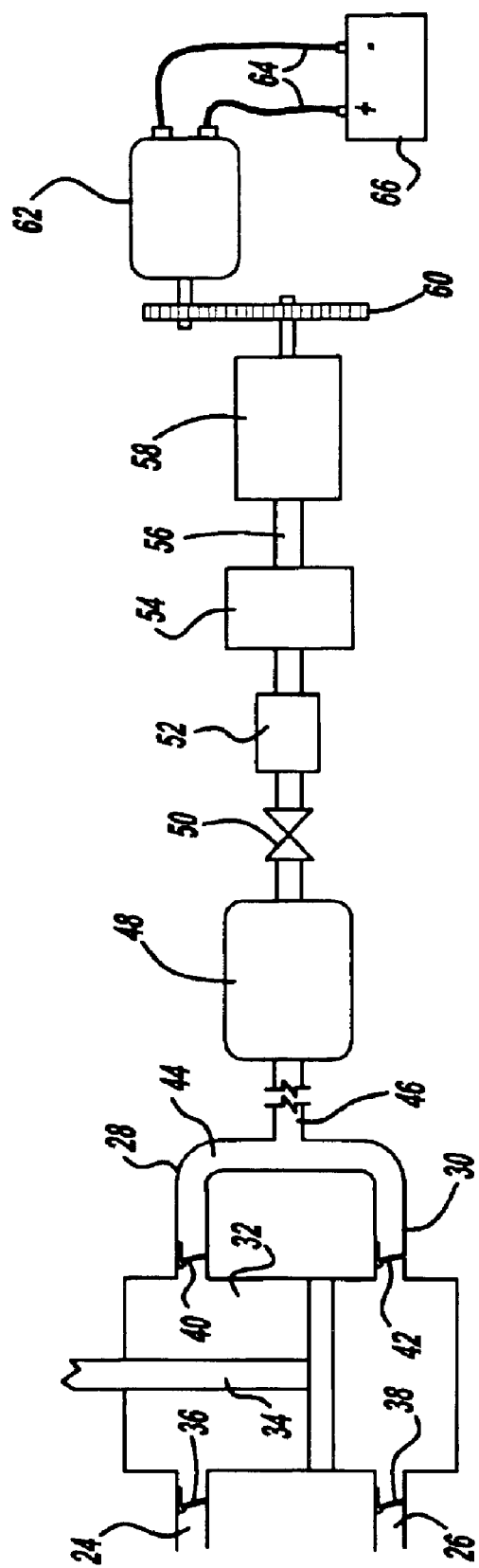
FIG. 2 illustrates a continuation of the system in FIG. 1 showing the transmission of compressed air to power generator and showing the power generation from compressed air.

FIGS. 1 and 2 illustrate the basic principle of the new invention. For simplicity, we limit our discussion to power conversion based on a seesaw. The cases of a swing and a merry-go-around can be considered similarly.

In FIG. 1, the seesaw 10 is often supplied with hard cylindrical helical springs 12, 14 to smoothen the actions of the seesaw mechanism. In the present mechanism, instead of the springs we employ two pneumatic cylinders 16, 18 on the two sides of the seesaw. To prevent any accidents and injuries to players' limbs from the moving pistons, we provide a bellows-type flexible sheath between the bottom of seesaw and the top of the cylinder as shown 20, 22. The outer bodies of the cylinders would get heated due to the compression of air inside. This would require shielding of the outer bodies too (not shown here).

To simplify the system and make it portable, the bottom end of the cylinders can also be fixed to the central support of the seesaw, rather than being fixed to the ground.

FIG. 2 shows the process of compression of air and its transmission to the power generator stage. For improved compression rate, we consider the case of double acting cylinder. The atmospheric air enters the cylinder input ports 24, 26 alternately through check (or plate) valves 36, 38. The reciprocating vertical motion of the piston 34 of the cylinder 32 under the motion of the seesaw results in compressed air being outputted through check valves 40, 42 via output ports 28, 30 to the pipeline through a union tee joint 44. Reference numeral 46 indicates that the pipeline could be very long. The compressed air from the pipeline is stored in an air tank 48. Essential parts of the air tank, such as pressure gage, pressure release valve, regulator, etc are not shown here for simplicity.

When the compressed air inside the air tank reaches a set pressure level, the on-off valve 50 is opened. The air is passed through a filter-regulator-lubricator unit 52. If the pressure of the stored air is low due to pressure drop along long pipeline, then an air booster 54 can be used to reduce the volume and increase the pressure of the air to the power generator unit.

FIG. 2 also illustrates the generation of power from the compressed air. The compressed air from the pipeline 56 is used to actuate an air motor 58. The electric generator 62 is coupled to the air motor 58 through a gear train 60. The resulting motion of the electric generator produces an electric current through the cables 64, which is used to charge the battery 66.

In general, air motors are very expensive compared to air cylinders and moreover require extensive gearing. Therefore, to reduce cost we can simply use compressed air from the pipeline 56 to actuate a cylinder which in turn can be used with a slider-crank mechanism to move the electric motor.

Figure 3:
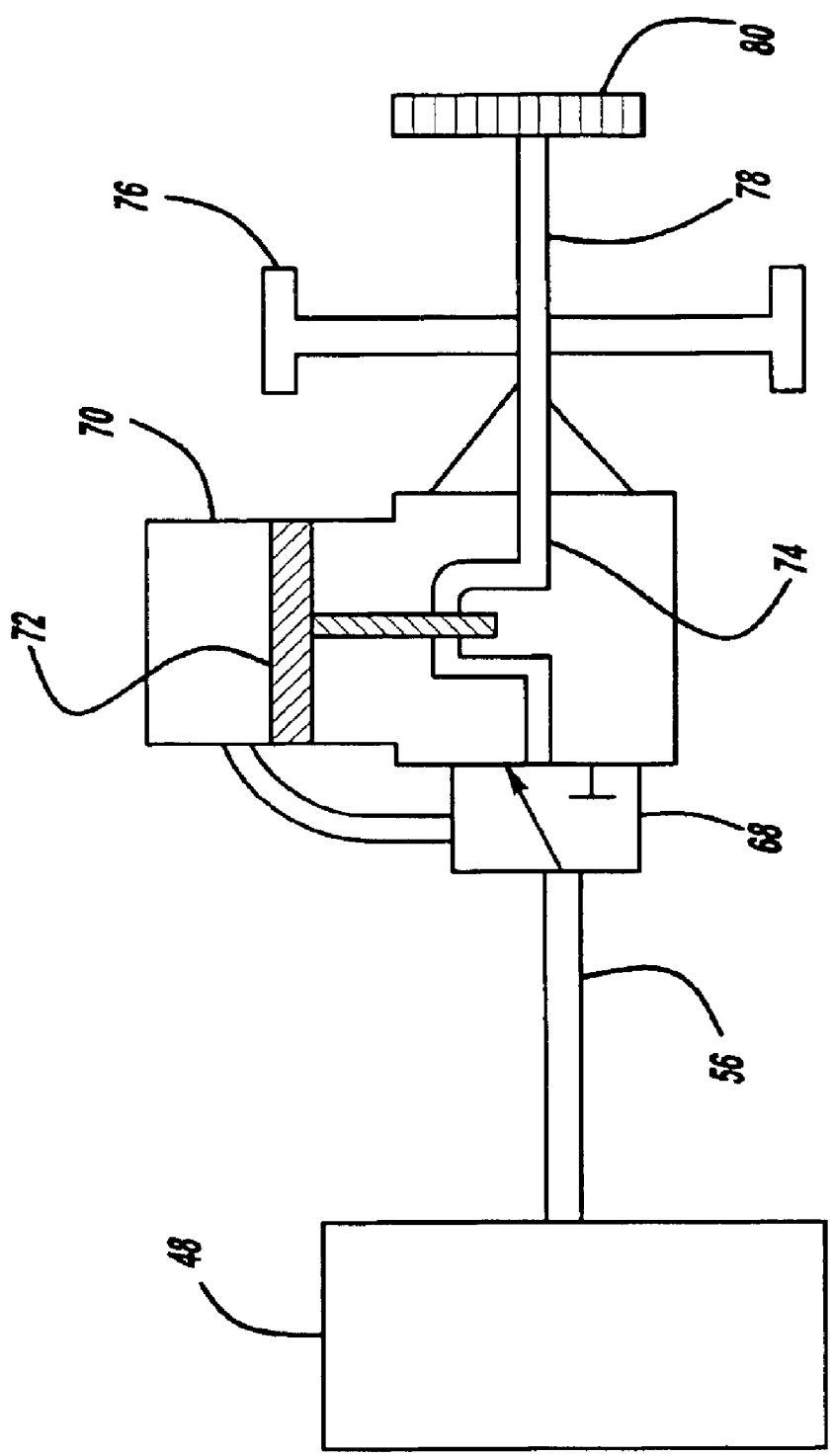
FIG. 3 illustrates a preferred embodiment of the present invention wherein the energy conversion is compressed air energy storage based on a seesaw using a slider-crank mechanism.

The operation of this mechanism is shown in FIG. 3.

Here, compressed air from air tank 48 is fed through pipeline 56 to an intake/exhaust valve 68 driven by crank shaft 74. For simplicity, the components shown in FIG. 2. viz., on-off valve and filter-regulator-lubricator unit are not shown here.

The compressed air drives a piston 72 housed in a cylinder 70 and attached to the crank shaft 74. A flywheel 76 is attached to the output shaft 78 of the crank shaft. A gear train 60 is connected at the end of the output shaft, and an electric generator-battery-wires combination as shown in FIG. 2 is used to generate electricity.

In the case of harnessing human power of children playing on a swing, a pneumatic rotary actuator can be used as the compression mechanism.

Figure 4:
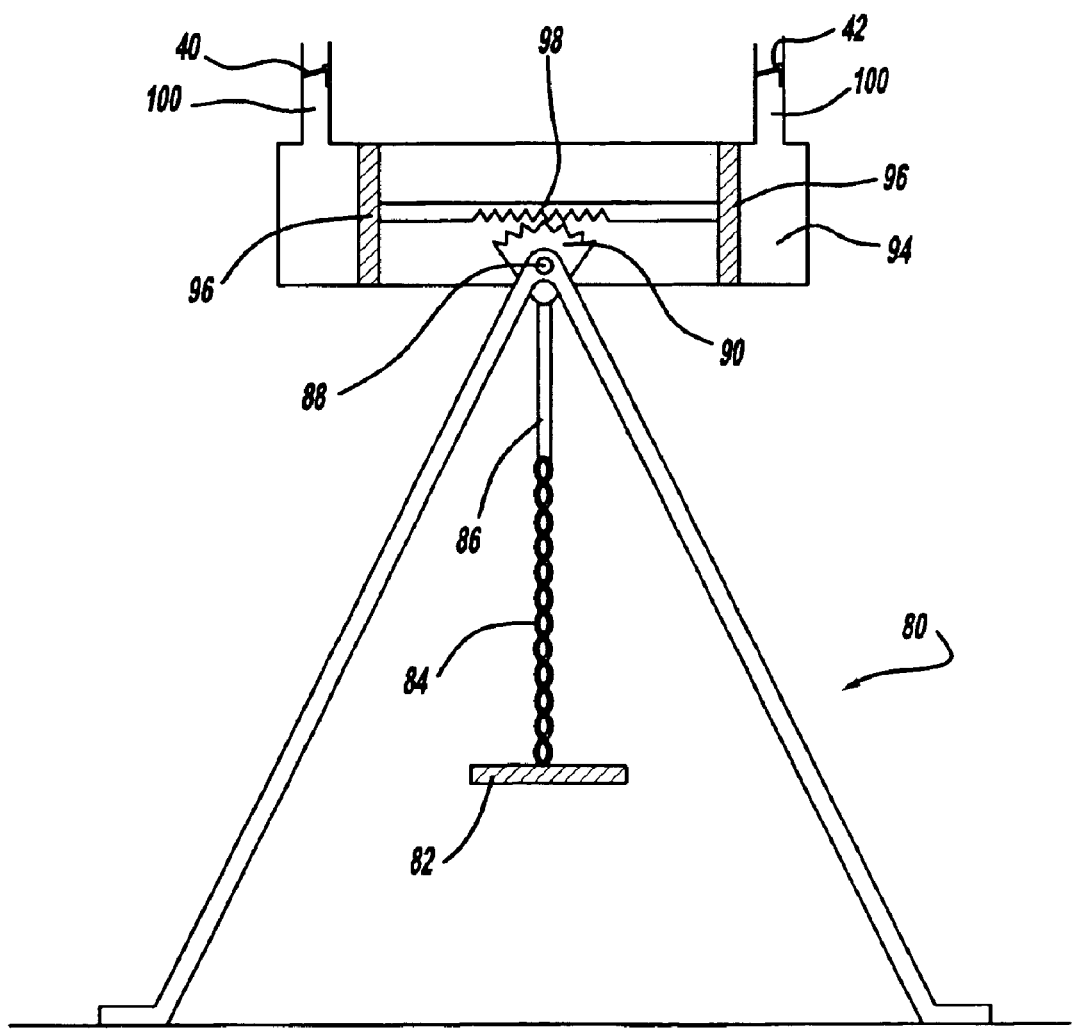
FIG. 4 illustrates a preferred embodiment of the present invention wherein the energy conversion is compressed air energy storage based on a swing using a pneumatic rotary actuator.

FIG. 4 illustrates this case. Here, a rigid arm 86 is connected through a swing pivot 88 to the top cross bar of the swing 80. The swing seat 82 is connected to the rigid arm 86 through the flexible chain 84. The use of the rigid arm allows the capture of a large portion of the torque of the swing's movement. The top end of the rigid arm 86 is fitted with a sector clear 90, which is connected to a rack gear 98 connected between the pistons 96 housed inside a cylinder 94. Two actuators are used, one at each end of the swing.

The rotational movements of the swing during children's play result in compression of air in the two closed chambers of the cylinder. The compressed air is released to the storage and power conversion section through output ports 100 under the control of check valves 40 and 42. The compressed air storage and power conversion sections are similar to those shown in FIG. 2 for the use of an air motor. Here again, rotary actuators are expensive and therefore a pinion-and-rack gearing mechanism can be used to actuate a double acting cylinder for compression of air. Swings are usually provided with flexible chains, therefore the extraction of the swing force for air compression will only be partial.

The mechanism shown in FIG. 4 may be used for this purpose. Commercial rotary actuators are also composed mainly of cylinders with rack-and-pinion gearing Air motors could be used in the case of merry-go-rounds for compression.

Figure 5A:
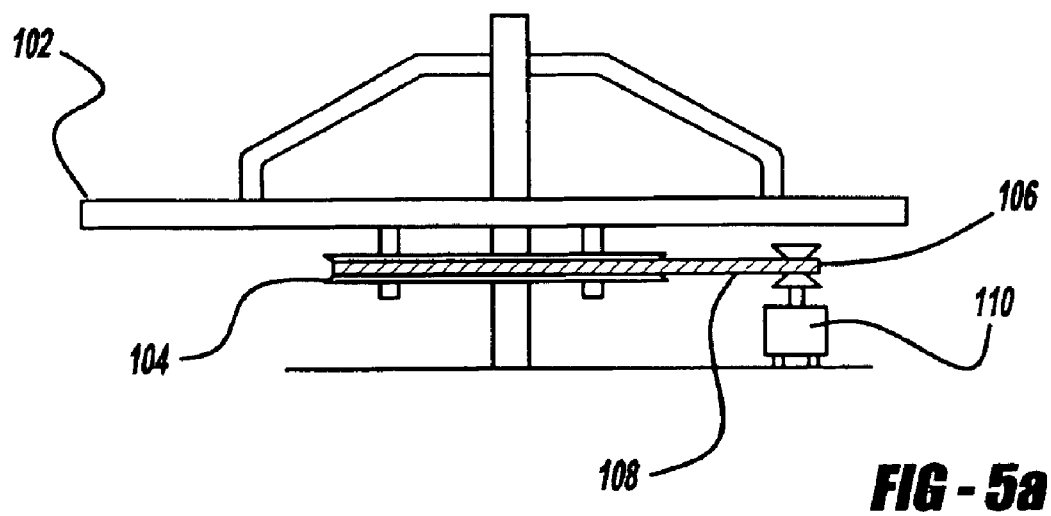
FIG. 5 illustrates a preferred embodiment of the present invention wherein the energy conversion is compressed air energy storage based on a merry-go-round using an air motor.
Figure 5B:
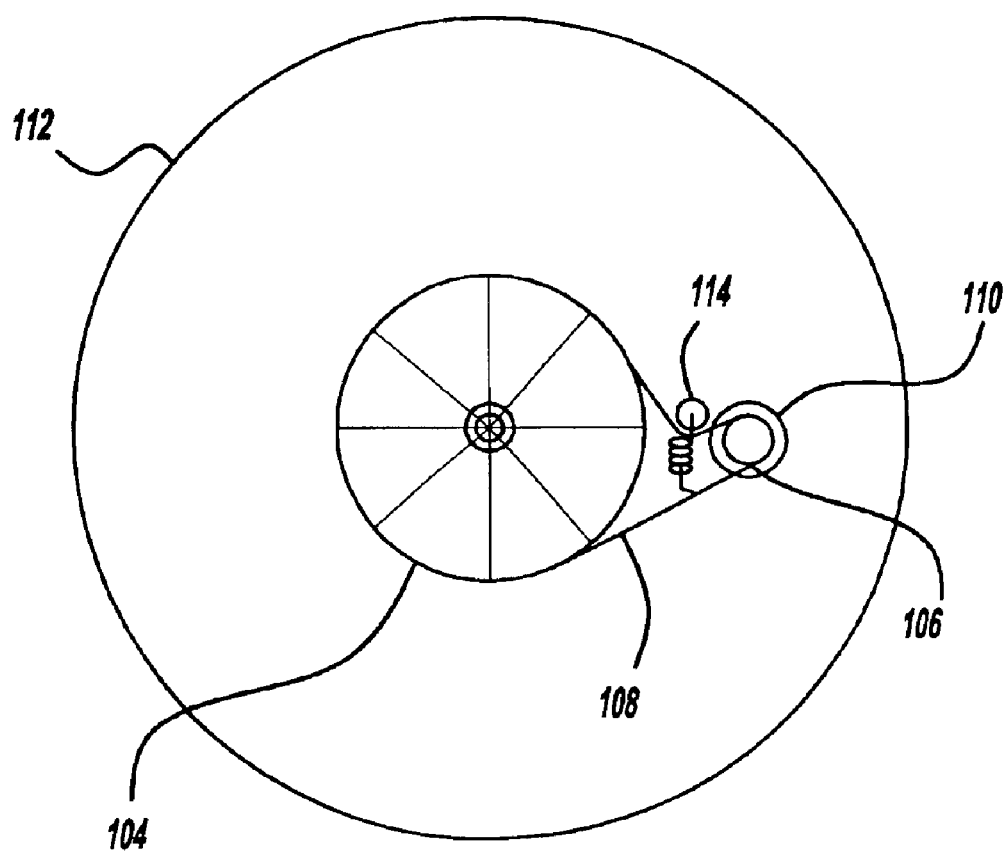

FIG. 5 illustrates this case. In the top view, the merry-go-round is shown transparent for clarity. A large diameter drive pulley 104 is connected to the bottom of the rotating disk 112 of the merry-go-round 102. A V-belt 108 moves along the drive pulley 104 due to the rotation of the merry-go-round. The V-belt passes over a motor pulley 106 whose shaft is connected to the air motor 110. A tensioner pulley with spring 114 is used to maintain the tongue on the air motor. Here too, due to cost considerations it will be preferable to use crank-slider mechanism (as used in positive displacement reciprocating piston-type compressors) with an air cylinder.

Figure 6A:
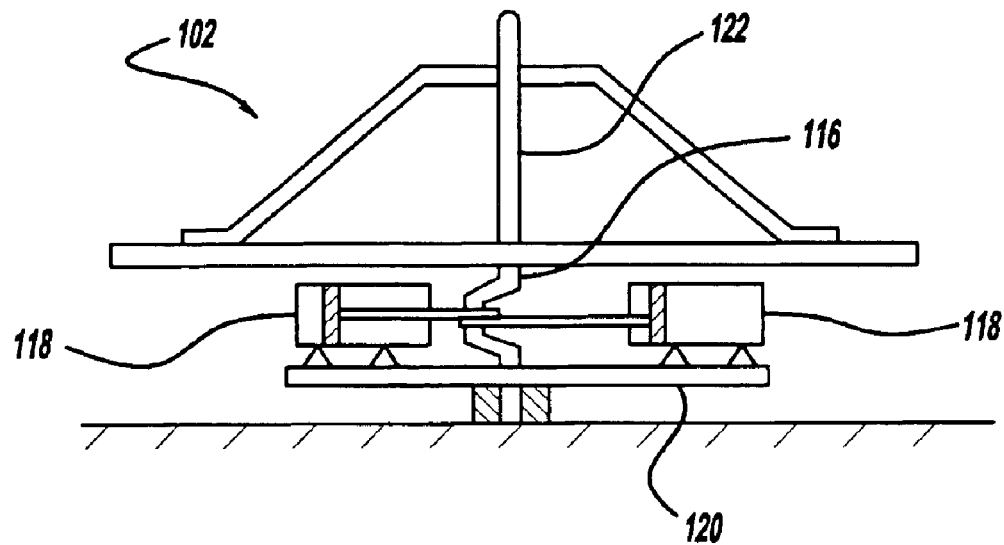
FIG. 6 illustrates a preferred embodiment of the present invention wherein the energy conversion is compressed air energy storage based on a merry-go-round using a crank-slider mechanism.
Figure 6B:
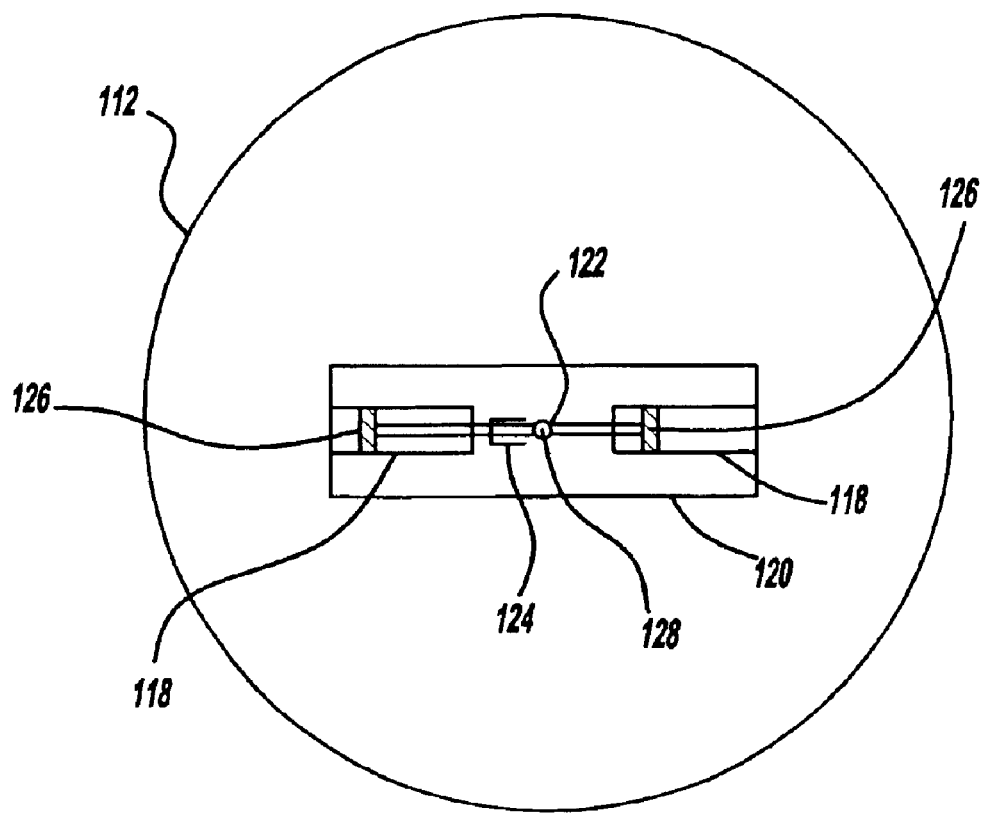

FIG. 6 illustrates this case. Here, two double-acting cylinders 118 are mounted on a support platform 120 below the rotating disk 112 of the merry-go-round 102. A crank 124 is attached to the bottom of the center post 116. Two cylinders are used with their pistons 126 connected to the crank 124 through connecting rod 128 to the centerpost 122.

Figure 7:
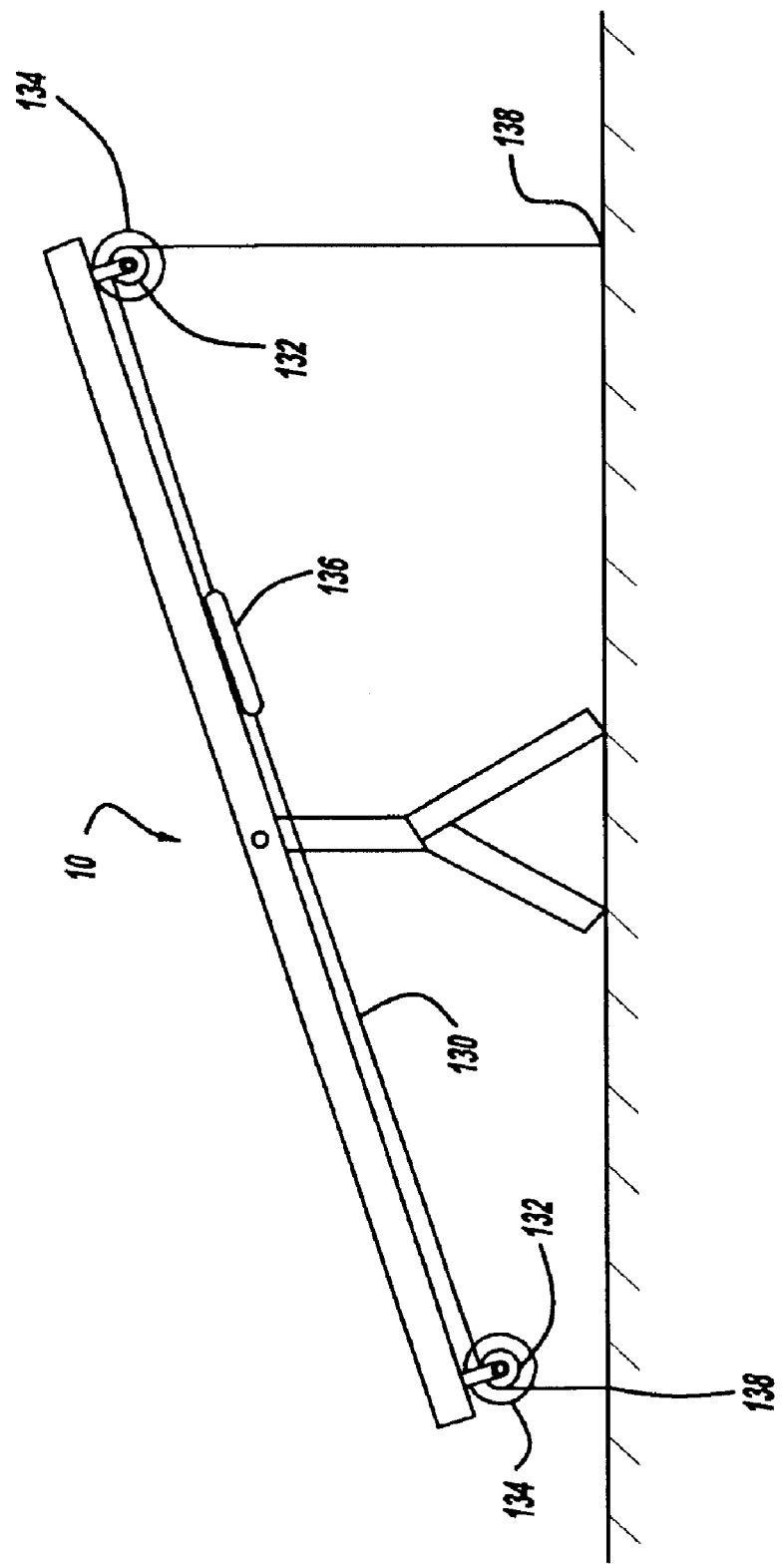
FIG. 7 illustrates a preferred embodiment of the present invention wherein the energy conversion is based on a seesaw using an electromagnetic generator.

FIG. 7 illustrates the use of electromagnetic generators to harness the power of children's play on the seesaw 10. A cable 130 runs through pulleys 132 attached to the bottom of the seesaw at the ends. The cable is wound once around the simple pulleys to ensure friction. Further, a spring 136 is used with the cable to maintain tension in the cable. Gear motors 134 are coupled to the shaft of the pulleys and the cable ends are anchored to the ground at 138.

Figure 8:
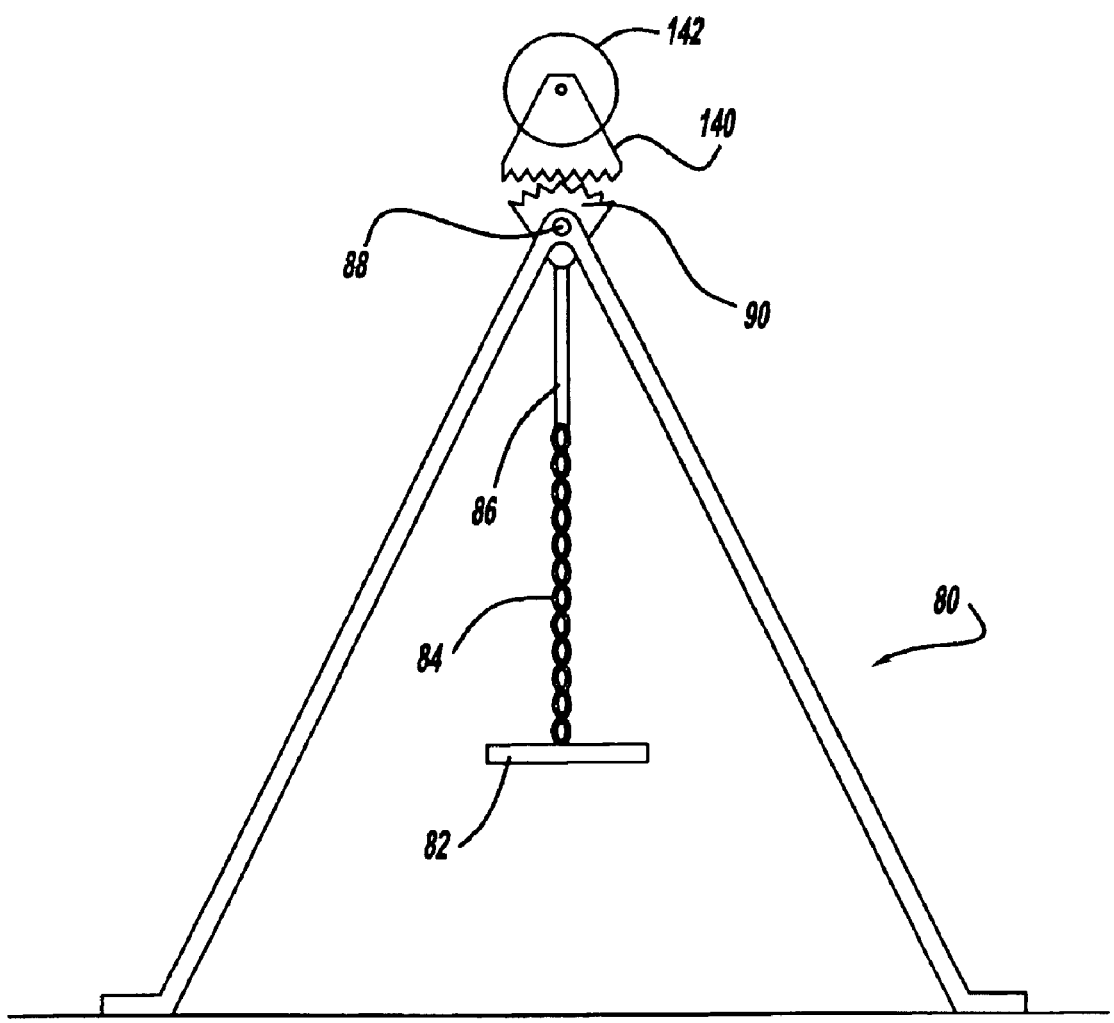
FIG. 8 illustrates a preferred embodiment of the present invention wherein the energy conversion is based on a swing using an electromagnetic generator.

The use of electromagnetic generator to convert the power from the swing is illustrated in FIG. 8. As in the pneumatic conversion case (shown in FIG. 4), the sector gear 90 is used, coupled to the rigid arm 86. A ear motor 142 is coupled to the shaft of the upper sector gear 140.

Figure 9A:
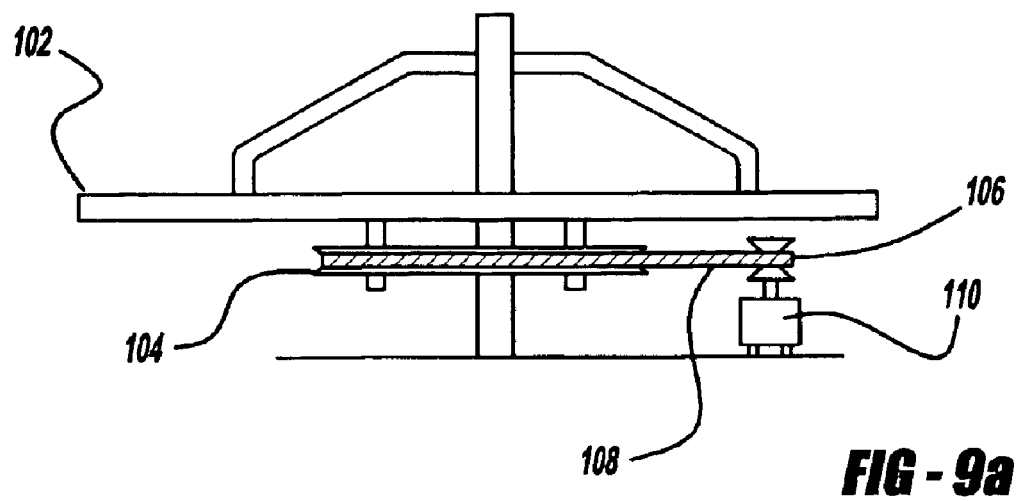
FIG. 9 illustrates a preferred embodiment of the present invention wherein the energy conversion is based on a merry-go-round using an electromagnetic generator.
Figure 9B:
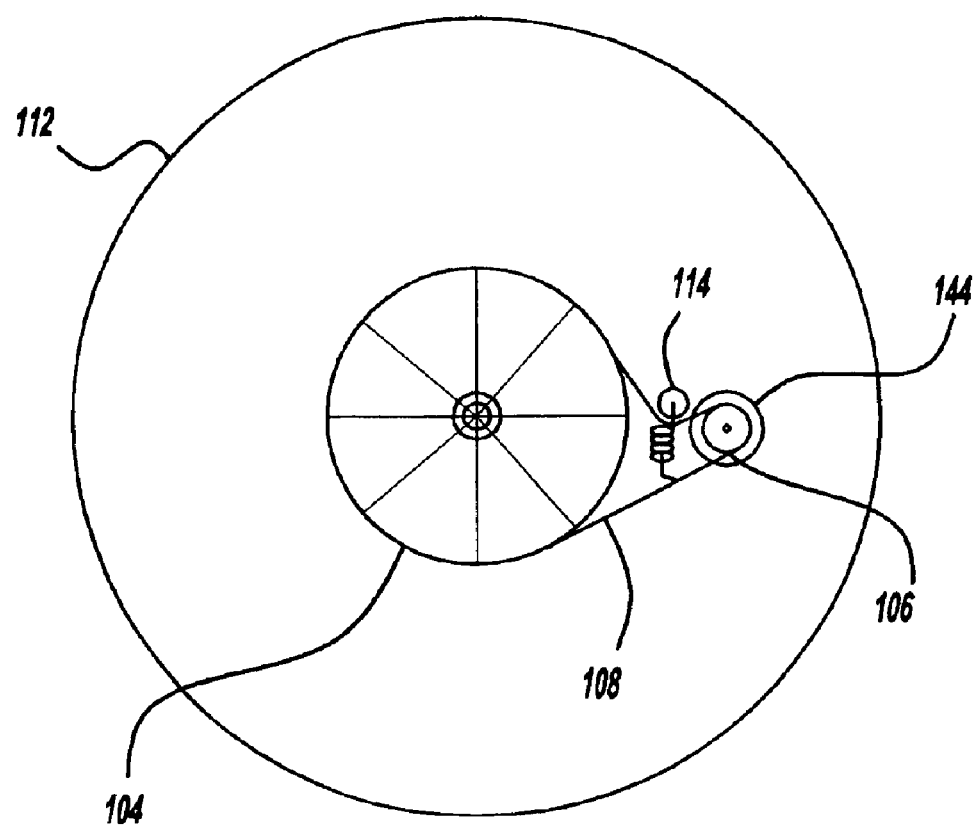
Figure 10:
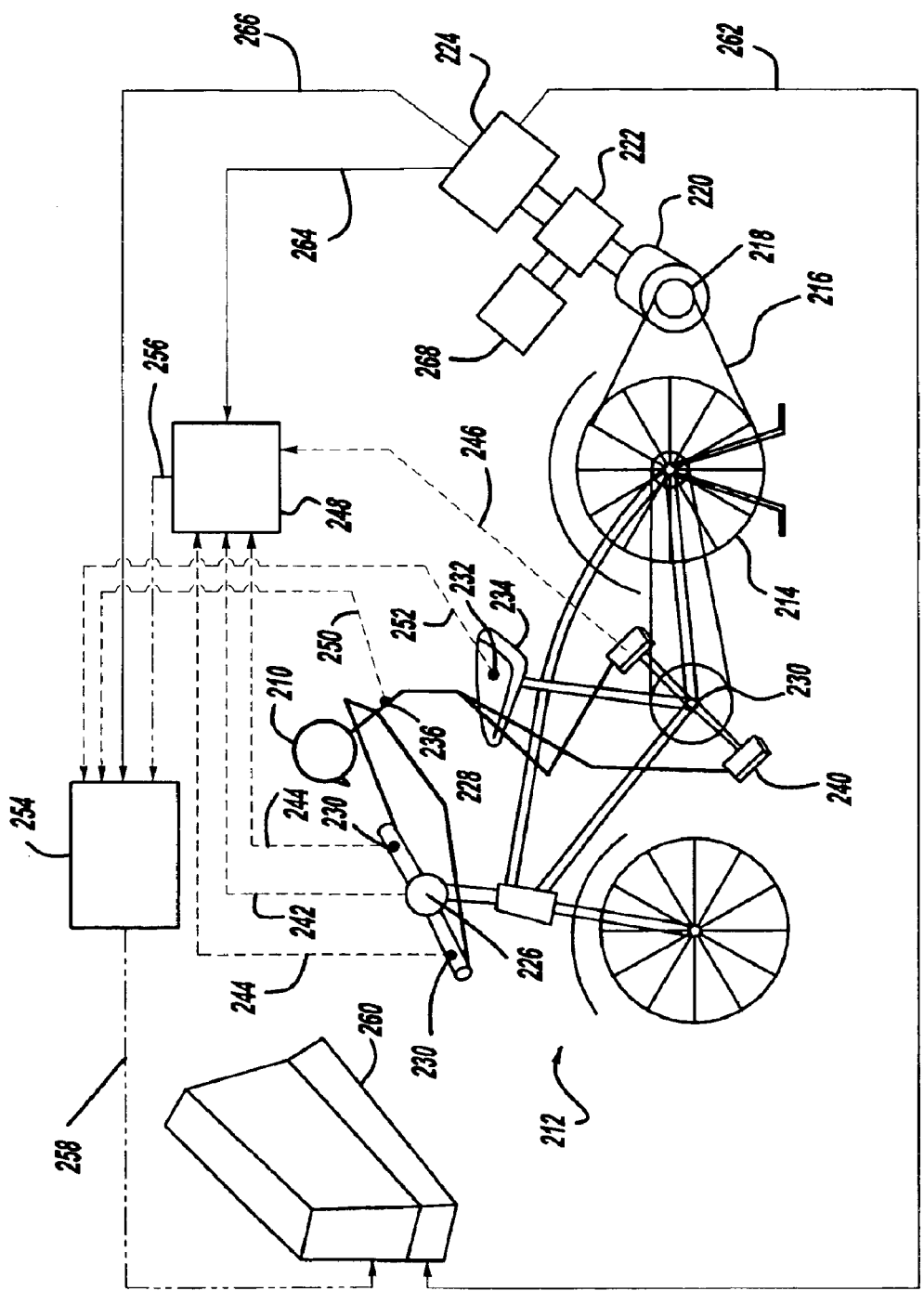
FIG. 10 illustrates a preferred embodiment of the present invention wherein the energy conversion is based on a stationery bicycle using an electromagnetic generator.

FIG. 9 illustrates the use of electromagnetic generator in connection with a merry-go-round. The mechanism is identical to the case of pneumatic conversion with air motor (shown in FIG. 5), except that a gear motor 144 acting as a generator replaces the air motor.

The up and down motion of the seesaw, and the to and fro motion of the swing results in alternately positive and negative voltage to be generated at the terminals of the gear motors, which act as generators. Therefore, an ac-to-dc rectifier will be used to generate a dc voltage for charging the battery (not shown for simplicity).

To reduce maintenance and improve the performance, it is necessary to filter the air entering the compressing cylinders. This is particularly so because air in the playground atmosphere is dust-filled. However, coarse air filters may be sufficient in most cases unlike in precision industrial operation. In practice, trade-offs between cost of air filters and cost of maintenance of low-cost cylinders may also be considered.

Finally, it may be mentioned that human power conversion is easily achieved from children's play under conditions where the children are static relative to the moving mechanism such as seesaw. Where the children are in a dynamic state relative to a static mechanism (e.g., slide) it will be difficult, though not impossible, to employ human power conversion techniques due to considerations of safety and simplicity.

The main alternative to the present pneumatic approach for human power conversion based on children's play would be to use electric (i.e., electromagnetic) generators. This method has the advantage of higher energy efficiency. However, as mentioned before it is constrained by the hazards of electric shock and leak hazards in children's playgrounds or meeting places. In fact, pneumatic motors are preferred over electric motors in applications such as opening and closing of aquarium tank doors for this same reason.

Minor variations of the pneumatic approach could also be implemented in practice: e.g., use mini gas turbines run by compressed air to move electric generators. However, for the kind of low-pressure energy storage system considered here, the reciprocating cylinder-type system is more economical and simpler to use.

Other approaches to producing renewable electricity for schools would be to install solar panels or wind turbines. However, the costs of these techniques would be far higher than those for the proposed invention.

In recent years, energy use/scarcity has become a serious problem due to depletion of non-renewable energy sources, increasing population, environmental pollution, and Global Warming. While in developed countries, the energy problem is one of short-term scarcity or optimum use, an estimated 40% of the world's population—or, 2 billion people in the less developed countries—do not have even have access to electricity. Moreover, this number is expected to double by the year 2050.

While the costs of solar, wind, geothermal, etc energy generation are coming down gradually, they are still beyond the reach of people in many developing countries, where majority of the population earns per capita incomes of less than a dollar a day. They do not have access to capital, technology, and resources such as oil, coal, or nuclear material. Even where there is an electricity grid, long-duration power outs are very common, particularly in summer when the rivers run dry.

Therefore, the invention outlined here could be used in playgrounds to provide very low-cost electric power for basic needs such as lighting, fans, and communication. The technology of compressed air involved is fairly simple, and well within the skills of technicians in developing countries. The material requirements are also fairly minimal: cylinders (variant of bicycle pumps could be used), valves, rubber or PVC pipelines, low-cost pressure gages and regulators, etc. The systems can easily be maintained and upgraded or repaired.

The use of the new technology also offers two significant side-benefits to children in developing countries: first, the promise of low-cost guaranteed electric power would encourage the introduction of reasonably well-equipped, safe and ergonomically designed play equipment in their schools and meeting places. Secondly, use of air filters as part of the compressed air systems could help reduce some of the air pollution in their school/background environments. The hybrid pneumatic-gasoline car invented by Guy Negre is similarly being adopted in high-pollution cities in Mexico and other developing countries because it acts as a negative emission vehicle, using atmospheric air for compression through on-board air filters.

The proposed systems can also be used for play by children at homes, contributing an alternative source of power.

Future modifications of the new invention also will have potential applications in a hi-tech setting, e.g. as a power source for wearable computing, emergency power source during earthquakes, and power assist for the elderly and handicapped.

Theoretical and experimental studies can be conducted to optimize the design of the proposed system, e.g., sizing of components, location of play equipment, etc.

The present invention has fairly limited application in developed countries where cheap and abundant electric power is readily available. The main potential for this invention lies in developing countries, where electricity supply is non-existent, erratic, or expensive.

The technology behind the new invention could be deployed on a wide scale in developing countries, with the manufacturing of the systems by local companies. Labor and materials will be a major part of the expenses involved, and local conditions would have a significant influence on the installation and running of the final systems in schools and playgrounds.

Although the invention has been described with particular reference to certain preferred embodiments thereof, variations and modifications can be effected within the spirit and scope of the following claims.

What is claimed is:

1. A method for producing power comprising the steps of:
   providing a piece of playground equipment equipped with a mechanism for compressing air from an ambient source when children set said equipment in motion;
   transmitting said compressed air to a storage tank via a pipeline extending from said mechanism to said storage tank;
   storing said compressed air within said storage tank until the air pressure within said tank reaches a pre-set level;
   opening an on-off valve located on said storage tank when said air pressure reaches said pre-set level;
   releasing said compressed air from said storage tank;
   passing said compressed air through a filter unit to an air motor;
   actuating said air motor;
   generating electricity from an electric generator coupled to said air motor via a gear train assembly;
   producing an electric current with said electric generator through cables extending from said generator to a battery;
   charging said battery with said electric current, wherein said charged battery provides power to operate appliances;
   wherein said playground equipment is a swing comprising a pneumatic rotary actuator for generating means for compressing said ambient air when said swing is swung.

2. The method of claim 1, further comprising the step of, wherein after said air is transmitted to said storage tank, providing an air booster for increasing said air pressure and reducing the air volume within said storage tank.

3. The method of claim 1, wherein a cylinder connected to a slider-crank mechanism is interchangeable with said air motor.

4. The method of claim 1, wherein a cylinder connected to a slider-crank mechanism is interchangeable with said motor.

5. A method for producing power comprising the steps of:
   providing a piece of playground equipment equipped with a mechanism for compressing air from an ambient source when children set said equipment in motion;
   transmitting said compressed air to a storage tank via a pipeline extending from said mechanism to said storage tank;
   storing said compressed air within said storage tank until the air pressure within said tank reaches a pre-set level;
   opening an on-off valve located on said storage tank when said air pressure reaches said pre-set level;
   releasing said compressed air from said storage tank;
   passing said compressed air through a filter unit to an air motor;
   actuating said air motor;
   generating electricity from an electric generator coupled to said air motor via a gear train assembly;
   producing an electric current with said electric generator through cables extending from said generator to a battery;
   charging said battery with said electric current, wherein said charged battery provides power to operate appliances;
   wherein said playground equipment is a swing comprising a rack and pinion gearing mechanism to actuate a double acting cylinder for generating means for compressing said ambient air when said swing is swung.

6. The method of claim 5, further comprising the step of, wherein after said compressed air is transmitted to said storage tank, providing an air booster for increasing said air pressure and reducing the air volume within said storage tank.

7. The method of claim 5, wherein a cylinder connected to a slider-crank mechanism is interchangeable with said air motor.

8. A method for producing power comprising the steps of:
   providing a piece of playground equipment equipped with a mechanism for compressing air from an ambient source when children set said equipment in motion;
   transmitting said compressed air to a storage tank via a pipeline extending from said mechanism to said storage tank;
   storing said compressed air within said storage tank until the air pressure within said tank reaches a pre-set level;
   opening an on-off valve located on said storage tank when said air pressure reaches said pre-set level;
   releasing said compressed air from said storage tank;
   passing said compressed air through a filter unit to an air motor;
   actuating said air motor;
   generating electricity from an electric generator coupled to said air motor via a gear train assembly;
   producing an electric current with said electric generator through cables extending from said generator to a battery;
   charging said battery with said electric current, wherein said charged battery provides power to operate appliances;
   wherein said playground equipment is a merry-go-round comprising an air motor for generating means for compressing said ambient air when said merry-go-round is rotated.

9. The method of claim 8, further comprising the step of, wherein after said compressed air is transmitted to said storage tank, providing an air booster for increasing said air pressure and reducing the air volume within said storage tank.

10. The method of claim 8, wherein a cylinder connected to a slider-crank mechanism is interchangeable with said air motor.

11. The method of claim 5, wherein a cylinder connected to a slider-crank mechanism is interchangeable with said motor.

12. The method of claim 8, wherein a cylinder connected to a slider-crank mechanism is interchangeable with said motor.

13. A method for producing power comprising the steps of:

providing a piece of playground equipment equipped with a mechanism for compressing air from an ambient source when children set said equipment in motion;

transmitting said compressed air to a storage tank via a pipeline extending from said mechanism to said storage tank;

storing said compressed air within said storage tank until the air pressure within said tank reaches a pre-set level;

opening an on-off valve located on said storage tank when said air pressure reaches said pre-set level;

releasing said compressed air from said storage tank;

passing said compressed air through a filter unit to an air motor;

actuating said air motor;

generating electricity from an electric generator coupled to said air motor via a gear train assembly;

producing an electric current with said electric generator through cables extending from said generator to a battery;

charging said battery with said electric current, wherein said charged battery provides power to operate appliances;

wherein said playground equipment is a merry-go-round comprising a crank-slider mechanism for use in conjunction with an air cylinder for generating means for compressing said air when said merry-go-round is rotated.

14. The method of claim 13, further comprising the step of, wherein after said air compressed is transmitted to said storage tank, providing an air booster for increasing said air pressure and reducing the air volume within said storage tank.

15. The method of claim 13, wherein a cylinder connected to a slider-crank mechanism is interchangeable with said air motor.

16. The method of claim 13, wherein a cylinder connected to a slider-crank mechanism is interchangeable with said motor.

* * * * *